(12) United States Patent
Kang

(10) Patent No.: US 7,317,666 B2
(45) Date of Patent: Jan. 8, 2008

(54) METHOD OF PLAYING OPTICAL RECORDING MEDIA

(75) Inventor: Se-hee Kang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 953 days.

(21) Appl. No.: 10/270,683

(22) Filed: Oct. 16, 2002

(65) Prior Publication Data

US 2003/0117907 A1 Jun. 26, 2003

(30) Foreign Application Priority Data

Dec. 22, 2001 (KR) ................ 2001-83302

(51) Int. Cl.
*G11B 7/085* (2006.01)
(52) U.S. Cl. ................ 369/30.09; 369/30.06
(58) Field of Classification Search ........... 369/13.02, 369/47.11, 53.11, 53.21, 30.01, 30.23, 275.3, 369/47.14, 53.15, 30.08, 30.05, 30.19, 30.09, 369/30.06, 47.15; 707/104.1
See application file for complete search history.

(56) References Cited

U.S. PATENT DOCUMENTS 6,542,445 B2* 4/2003 Ijichi et al. ............. 369/30.08

7,136,874 B2* 11/2006 Mercer et al. ........... 707/104.1

FOREIGN PATENT DOCUMENTS

| KR | 93-702758 | 9/1993 |
|----|-----------|--------|
| KR | 10-2000-0051236 | 8/2000 |
| KR | 2002-0009550 | 2/2002 |

OTHER PUBLICATIONS

Korean Office Action, no date.

* cited by examiner

*Primary Examiner*—Ali Neyzari
(74) *Attorney, Agent, or Firm*—Staas & Halsey LLP

(57) ABSTRACT

A method of reproducing information, and more particularly, a method of playing an optical recording medium storing music files by which a user can load only desired directories from the optical recording medium to reproduce the music files contained therein. Directories are searched from the optical recording medium and are displayed on a screen if the optical recording medium is driven. Desired ones of the directories are selected from the displayed directories and are loaded. Information corresponding to the loaded directories is reproduced. Only a directory selected by a user is loaded and reproduced. Thus, disc-loading time is saved so that the user can rapidly reproduce desired information.

17 Claims, 2 Drawing Sheets

METHOD OF PLAYING OPTICAL RECORDING MEDIA

CROSS-REFERENCE TO RELATED APPLICATIONS

This application claims the benefit of Korean Application No. 2001-83302, filed Dec. 22, 2001 in the Korean Intellectual Property Office, the disclosure of which is incorporated herein by reference.

BACKGROUND OF THE INVENTION

1. Field of the Invention

The present invention relates to a method of reproducing information, and more particularly, to a method of playing an optical recording medium storing music files by which a user can load only desired directories from the optical recording medium to reproduce the music files.

2. Description of the Related Art

In general, Digital Video Discs (DVDs) are storage media which have the same size as compact discs (CDs) with a diameter of 12 cm and a thickness of 1.2 mm, but which store 7 times the data stored on CDs. Specifically, CDs can store 74 minutes worth of audio data, which corresponds to 688 MB worth of data. DVDs can store the more than the same minute quantity as CDs since DVDs have a storage capacity of 4.7 GB to 17 GB, the maximum amount depending on whether a reproduction plane is single or double-sided, or a single layer or a double layer. Since DVDs have a large capacity, they can store 100 to 200 MPEG Layer 3 (MP3) music files. Assuming that each music file is 4 Mbytes, a 4.7 G DVD can store about 1000 pieces of music. In contrast, a CD-R can store about 150 music files.

FIG. 1 is a flowchart explaining a method of playing an optical recording medium according to the prior art. An optical disc is inserted into an optical recording medium player and driven (i.e., loaded) in operation 100. Information is read from a primary volume descriptor (PVD) and a supplementary volume descriptor (SVD), and directories and addresses designated by other control data are searched and stored in operation 101. MP3 files are searched from the search directories in operation 102. The searched MP3 files are reproduced in operation 103.

In the conventional method of playing the optical recording medium, all directories in the optical recording medium are loaded to reproduce the MP3 files. Thus, the MP3 files to which a user does not desire to listen are also loaded, which lengthens the loading time according to the storage capacity.

SUMMARY OF THE INVENTION

To solve the above and other problems, it is an object of the present invention to provide a method of playing an optical recording medium storing music files by which a user can load only desired directories from the optical recording medium to reproduce the music files.

Additional objects and advantages of the invention will be set forth in part in the description which follows and, in part, will be obvious from the description, or may be learned by practice of the invention.

Accordingly, to achieve the above and other objects, there is provided a method of playing an optical recording medium, in which directories are searched from the optical recording medium and are displayed on a screen if the optical recording medium is driven, desired ones of the directories are selected from the displayed directories and are loaded, and information corresponding to the loaded directories is reproduced.

According to an aspect of the invention, the user sets the desired directories in advance.

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Figure 1:
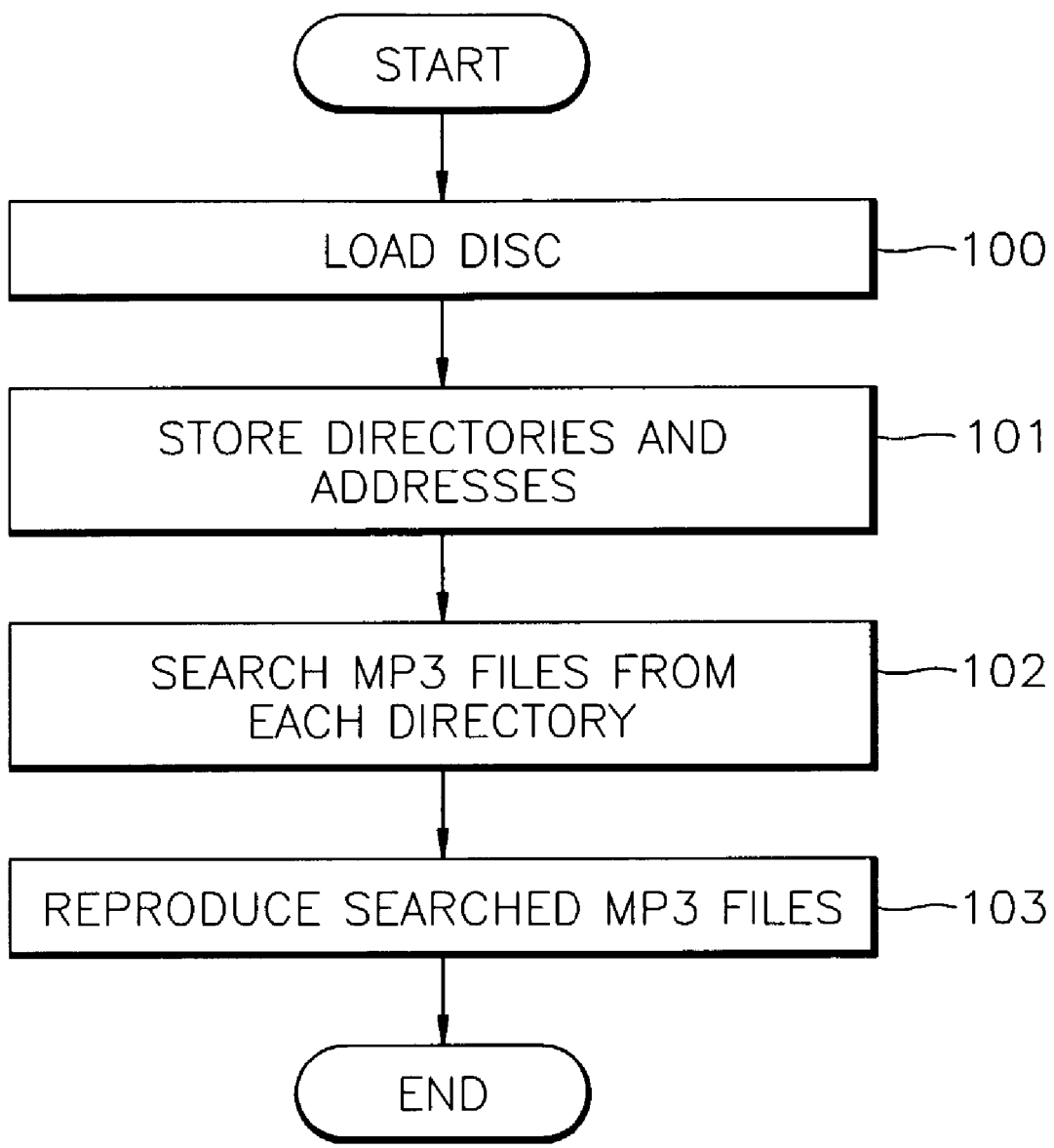
FIG. 1 is a flowchart explaining a method of playing an optical recording medium according to the prior art.

Reference will now be made in detail to the present preferred embodiments of the present invention, examples of which are illustrated in the accompanying drawings, wherein like reference numerals refer to the like elements throughout. Hereinafter, embodiments of the present invention will be described in detail with reference to the accompanying drawings.

Figure 2:
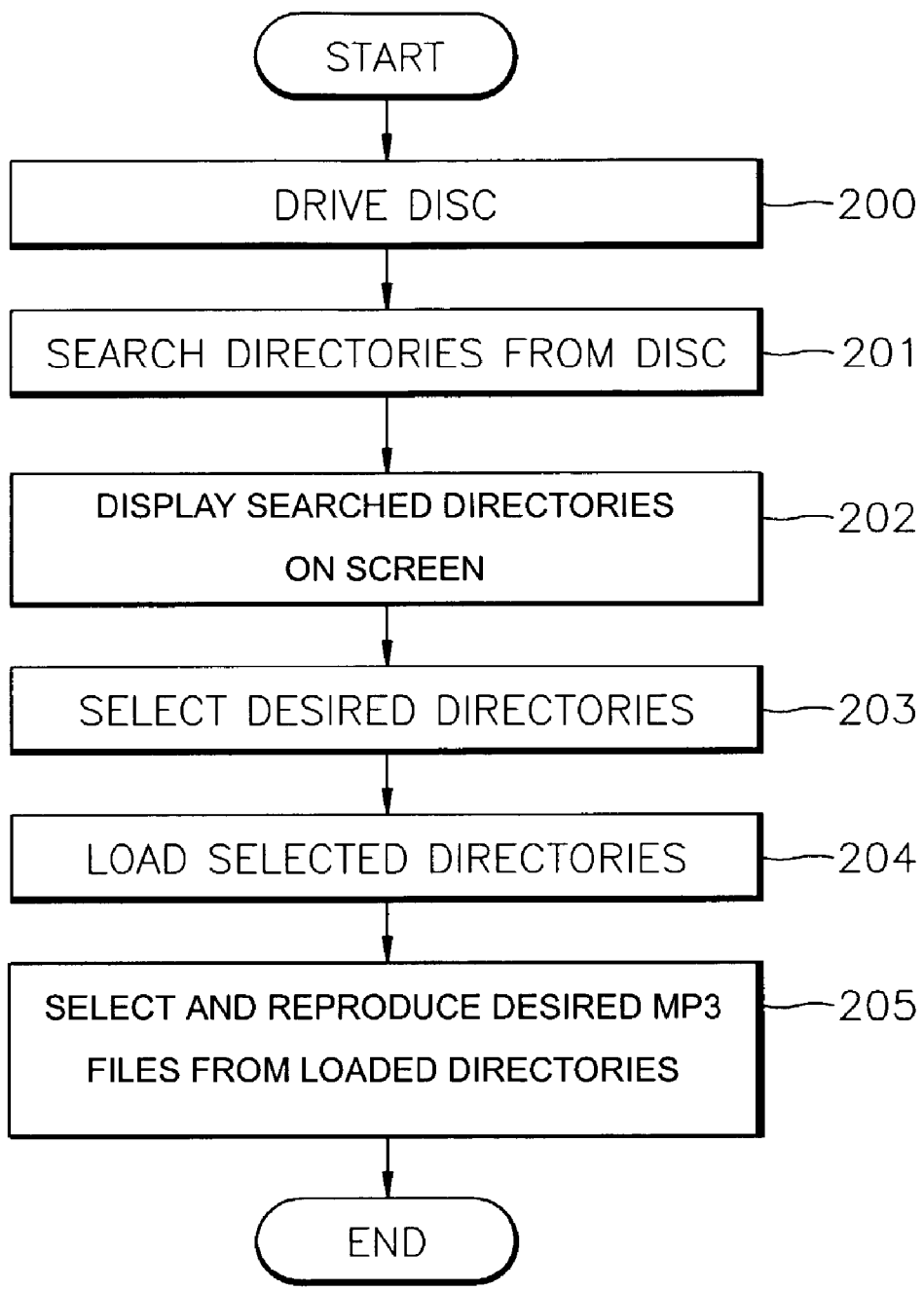
FIG. 2 is a flowchart explaining a method of playing an optical recording medium according to an embodiment of the present invention.

FIG. 2 is a flowchart explaining a method of playing an optical recording medium according to an embodiment of the present invention. A disc is driven in operation 200. Directories are searched from the disc in operation 201. The directories are displayed on a screen in operation 202. Desired directories are selected in operation 203. The selected directories are loaded in operation 204. The desired MP3 files are selected from the loaded directories and are reproduced in operation 205.

The present invention will be described in more detail with reference to FIG. 2. In operation 200, a disc storing MP3 files is inserted into a player and driven to reproduce MP3 files desired by a user. Directories are searched from the disc in operation 201. Information is read from a PVD and an SVD and directories designated by other control data are searched in operation 201. Here, the user can set desirable directories for each singer, each genre, or the like.

The searched directories are displayed on the screen in operation 202. Here, the screen displays first, second, and third directories. For example, the first directory loads only male singers' music files, the second directory loads only female singers' music files, and the third directory loads all kinds of music files.

The user selects desirable ones of the displayed directories in operation 203. For example, the user selects the second one of the displayed directories. The directory selected by the user is loaded in operation 204. Here, the selected second directory is loaded to search MP3 music files.

The desired MP3 files are selected from the loaded directory and reproduced in operation 205. The searched MP3 files are displayed on the screen and the user selects desirable ones from the displayed MP3 files, and reproduces and listens to the selected MP3 files.

As described above, according to the present invention, only a directory selected by a user is loaded and reproduced. Thus, disc-loading time is saved so that the user can rapidly reproduce desirable information.

While described in terms of MP3 files, it is understood that the data files need not be compressed and may be reproduced in uncompressed formats. Further, it is understood that the data file may be in a format including, but not limited to, MPEG4, ATRAC3, AIFF, WAVE, Real Audio, MIDI, AU, Quick Time, Liquid Audio, Windows Media Audio and other audio and/or video formats. Further, it is understood that the invention can be used with non-audio files, such as data and video files. Additionally, it is understood that other types of recoding media such as magnetic media may be used instead of or in addition to optical recording media. Lastly, it is understood that the player of an embodiment of the present invention is a reproducing and/or recording apparatus controlled by a computer, where the method is encoded on a computer readable medium readable by the computer.

While this invention has been particularly shown and described with reference to a embodiment thereof, it will be understood by those skilled in the art that various changes in form and details may be made therein without departing from the spirit and scope of the invention as defined by the accompanying claims and equivalents thereof.

What is claimed is:

1. A method of playing an optical recording medium, the method comprising:
   searching directories from the optical recording medium and displaying the searched directories on a screen if the optical recording medium is driven;
   selecting desired ones of the displayed directories and loading the selected directories; and
   reproducing information corresponding to the loaded directories,
   wherein the searching directories comprises reading a primary volume descriptor and a supplementary volume descriptor.

2. The method of claim 1, further comprising pre-selecting the desired directories in advance of driving the optical recording medium, wherein said selecting the desired ones of the displayed directories comprises selecting the directories which have been pre-selected.

3. The method of claim 2, wherein one of the desired directories corresponds to one artist.

4. The method of claim 2, wherein one of the desired directories corresponds to one genre of music.

5. The method of claim 1, wherein the information is encoded as MPEG Layer 3 data.

6. A method of playing an optical recording medium, the method comprising:
   searching directories from the optical recording medium and displaying the searched directories on a screen if the optical recording medium is driven:
   selecting desired ones of the displayed directories and loading the selected directories: and
   reproducing information corresponding to the loaded directories,
   wherein said selecting the desired directories and loading the selected directories comprises loading the selected directories and not loading the remaining directories which were displayed on the screen but which were not selected.

7. A method of playing a recording medium, the method comprising:
   searching directories from the recording medium if the recording medium is driven;
   selecting desired ones of the searched directories; and
   loading only the selected directories so as to allow reproduction of information in the selected directories,
   wherein said searching the directories comprises reading a primary volume descriptor and a supplementary volume descriptor.

8. The method of claim 7, further comprising pre-selecting the desired directories prior to driving the recording medium, wherein said selecting the desired ones of the searched directories comprises selecting the directories which have been pre-selected.

9. The method of claim 8, wherein one of the desired directories corresponds to one artist.

10. The method of claim 8, wherein one of the desired directories corresponds to one genre of music.

11. The method of claim 7, wherein the information is encoded as MPEG Layer 3 data.

12. The method of claim 7, further comprising displaying the searched directories on a screen prior to loading the desired ones of the directories, wherein said selecting the desired directories and loading the selected directories comprises loading the selected directories and not loading the remaining directories which were displayed on the screen but which were not selected.

13. A computer readable medium encoded with processing instructions for implementing a method of loading and playing information stored on a recordable medium as performed by a computer, the method comprising:
   searching directories from the recording medium if the recording medium is driven;
   selecting desired ones of the searched directories; and
   loading only the selected directories so as to allow reproduction of information in the selected directories,
   wherein said searching the directories comprises reading a primary volume descriptor and a supplementary volume descriptor.

14. The computer readable medium of claim 13, further comprising pre-selecting the desired directories prior to driving the recording medium, wherein said selecting the desired ones of the searched directories comprises selecting the directories which have been pre-selected.

15. The computer readable medium of claim 13, wherein the information is encoded as MPEG Layer 3 data.

16. The computer readable medium of claim 15, further comprising displaying the searched directories on a screen prior to loading the desired ones of the directories, wherein said selecting the desired directories and loading the selected directories comprises loading the selected directories and not loading the remaining directories which were displayed on the screen but which were not selected.

17. A computer readable medium encoded with processing instructions for implementing a method of loading and playing information stored on a recordable medium as performed by a computer, the method comprising:
   searching directories from the recording medium if the recording medium is driven;
   selecting desired ones of the searched directories
   loading only the selected directories so as to allow reproduction of information in the selected directories; and
   displaying the searched directories on a screen prior to loading the desired ones of the directories, wherein said selecting the desired directories and loading the selected directories comprises loading the selected directories and not loading the remaining directories which were displayed on the screen but which were not selected.

* * * * *

UNITED STATES PATENT AND TRADEMARK OFFICE
CERTIFICATE OF CORRECTION

PATENT NO.       : 7,317,666 B2                                       Page 1 of 1
APPLICATION NO.  : 10/270683
DATED            : January 8, 2008
INVENTOR(S)      : Se-hee Kang It is certified that error appears in the above-identified patent and that said Letters Patent is hereby corrected as shown below:

Column 3, Line 51, change "driven:" to --driven;--.

Column 3, Line 53, change "directories:" to --directories;--.

Column 4, Line 53, change "directories" to --directories;--.

Signed and Sealed this

First Day of July, 2008

JON W. DUDAS
*Director of the United States Patent and Trademark Office*